US009886542B2

(12) United States Patent
Han et al.

(10) Patent No.: US 9,886,542 B2
(45) Date of Patent: Feb. 6, 2018

(54) MODELING TSV INTERPOSER CONSIDERING DEPLETION CAPACITANCE AND SUBSTRATE EFFECTS (71) Applicants: Ki Jin Han, Uslan (KR); Madhavan Swaminathan, Marietta, GA (US)

(72) Inventors: Ki Jin Han, Uslan (KR); Madhavan Swaminathan, Marietta, GA (US)

(73) Assignee: E-System Design, Inc., Savannah, GA (US)

( * ) Notice: Subject to any disclaimer, the term of this patent is extended or adjusted under 35 U.S.C. 154(b) by 181 days.

(21) Appl. No.: 14/816,268

(22) Filed: Aug. 3, 2015

(65) Prior Publication Data

US 2016/0034633 A1 Feb. 4, 2016

Related U.S. Application Data (60) Provisional application No. 62/032,865, filed on Aug. 4, 2014.

(51) Int. Cl.
*G06F 17/00* (2006.01)
*G06F 17/50* (2006.01)

(52) U.S. Cl.
CPC ........ *G06F 17/5081* (2013.01); *G06F 17/504* (2013.01); *G06F 17/5036* (2013.01); *G06F 2217/82* (2013.01)

(58) Field of Classification Search
None
See application file for complete search history.

(56) References Cited

U.S. PATENT DOCUMENTS

| 8,352,232 B2 * | 1/2013 | Han | G06F 17/5036 703/13 |
| 8,504,962 B1 * | 8/2013 | Kourkoulos | G06F 17/5036 716/110 |
| 8,959,009 B1 * | 2/2015 | Sercu | G06F 17/5036 703/13 |

OTHER PUBLICATIONS

K.J. Han et al., "Electromagnetic Modeling of Through-Silicon via (TSV) Interconnections Using Cylindrical Modal Basis Functions," IEEE Trans. on Advanced Packaging, vol. 33, No. 4, Nov. 2010, pp. 804-817.*

(Continued)

*Primary Examiner* — Leigh Garbowski
(74) *Attorney, Agent, or Firm* — Bryan W. Bockhop; Bockhop Intellectual Property Law, LLC (57) ABSTRACT In a method for modeling electromagnetic effects in a planar circuit that employs a plurality of through-silicon vias in a domain, a region around each through-silicon via is described in terms of a cylindrical accumulation mode basis function. The cylindrical accumulation mode basis function is incorporated into an equivalent circuit that describes selected electrical characteristics of each through-silicon via. A plurality of localized intervals around each through-silicon via is selected. A multilayer Green's function is approximated for $I^{MN}_{zz'}$ (wherein M and N identify selected layers and wherein zz' designates layer boundaries in a layer through which the through-silicon via passes) in each localized interval without approximating the Green's function over the entire domain. Coefficients $I^{MN}_{zz'}$ are approximated over a predetermined range of frequencies ($\omega$). Admittance parameters based on of $I^{MN}_{zz'}$ are calculated over a frequency sweep.

20 Claims, 9 Drawing Sheets (56) References Cited

OTHER PUBLICATIONS

C. Xu et al., "Fast Extraction of High-Frequency Parallel Admittance of THrough-Silicon-Vias and their Capacitive Coupling-Noise to Active Regions," IEEE 2012, 3 pages.*
V. Kourkoulos et al., "Through Silicon Via Admittance Field Solver of System Level Capacity: Theory," 2013 IEEE, 4 pages.*
K. J. Han et al., "Consideration of MOS Capacitance Effect in TSV Modeling Based on Cylindrical Modal Basis Functions," 2012 IEEE Electrical Design of Advanced Packaging and Systems Symposium (EDAPS), pp. 41-44.*
S. V. Kochetov et al., "PEEC Formulation Based on Dyadic Green's Functions for Layered Media in the Time and Frequency Domains," IEEE Trans. on Electromagnetic Compatibility, vol. 50, No. 4, Nov. 2008, pp. 953-965.*

\* cited by examiner

MODELING TSV INTERPOSER CONSIDERING DEPLETION CAPACITANCE AND SUBSTRATE EFFECTS

CROSS-REFERENCE TO RELATED APPLICATION(S)

This application claims the benefit of U.S. Provisional Patent Application Ser. No. 62/032,865, filed Aug. 4, 2014, the entirety of which is hereby incorporated herein by reference.

BACKGROUND OF THE INVENTION

1. Field of the Invention

The present invention relates to systems for modeling electronic circuits and, more specifically, to a system for modeling electromagnetic effects in circuits with through silicon vias.

2. Description of the Related Art

After several years of effort on the realization of silicon-based three-dimensional (3-D) integration using through-silicon vias (TSVs), major semiconductor companies have recently started mass production using this technology for field-programmable gate array (FPGA) and flash memory applications. Along with the first success in commercialization through process development, system-level designers are beginning to realize that further progress in performance is possible only with the support of sophisticated design tools based on comprehensive electrical modeling of TSVs. Although existing TSV modeling methods, which provide simple equivalent circuits, have been successfully adopted for initial design validations, they neglect or approximately consider important characteristics required for design optimization.

A major characteristic to be considered for enhancing the functionality of modeling is the effect of depletion region that is formed when a bias voltage is applied to TSVs. Since the depletion region adds another capacitance to the oxide liner, the values of parasitic elements in TSVs are modified. Also, the tunable property of the MOS capacitance can be utilized for adaptive circuit design. For modeling the effect of the TSV depletion capacitance, previous systems applied semiconductor equations to the cylindrical TSV structure. However, such systems focused on the depletion region of a single TSV without considering the interaction between multiple TSVs having depletion regions when constructing an equivalent circuit.

Another characteristic to be included for improving modeling accuracy is the effect of the finite silicon substrate. The substrate effect should be modeled more accurately for TSV interposers since the substrate thickness is becoming smaller due to wafer thinning processes. Current circuit modeling methods handle the effect by applying 2-D formulas to simple partitioned sections, but such methods are not accurate when each section length is small compared to the cross-sectional dimension of TSVs.

Therefore, there is a need for a modeling method for TSVs that includes depletion region modeling of several TSVs and that includes modeling of finite silicon substrates.

SUMMARY OF THE INVENTION

The disadvantages of the prior art are overcome by the present invention which, in one aspect, is a method for modeling electromagnetic effects in a planar circuit that employs a plurality of through-silicon vias in a domain. A region around each through-silicon via is described in terms of a cylindrical accumulation mode basis function by determining a dimension of at least one oxide layer and by determining a dimension of at least one depletion region. The cylindrical accumulation mode basis function is incorporated into an equivalent circuit that describes selected electrical characteristics of each through-silicon via. A plurality of localized intervals around each through-silicon via is selected. A multilayer Green's function is approximated for $I^{MN}_{zz'}$ (wherein M and N identify selected layers and wherein zz' designates layer boundaries in a layer through which the through-silicon via passes) in each localized interval without approximating the Green's function over the entire domain as part of a partial element computation, wherein $I^{MN}_{zz'}$ is given by $$P_{k,l} = \int_{S_l}\int_{S_k} v_k v_l I^{MN}_{zz'}(\omega) dS_k\, dS_l,$$

where $$I^{MN}_{zz'}(\omega, \rho) = j\frac{\omega}{2\pi}\int_0^\infty \frac{1}{k_\rho}\int_{Z_{N1}}^{Z_{N2}}\int_{Z_{M1}}^{Z_{M2}}(\tilde{G}^{V_e}_{MN} - \tilde{G}^{V_h}_{MN})dz dz' J_0(k_\rho \xi)dk_\rho$$

and where $v_k$ and $v_l$ are cylindrical accumulation mode basis functions. The coefficients of $A(\omega)$, $B(\omega)$ and $C(\omega)$ of $$I^{MN}_{zz'}(\omega, \rho) = \begin{cases} A(\omega)\ln\rho + B(\omega) & \rho \in I_1 \\ A(\omega)\ln\rho^2 + B(\omega)\rho + C(\omega) & \rho \in I_2 \end{cases},$$

describing $I^{MN}_{zz'}$ are approximated over a predetermined range of frequencies ($\omega$). Frequency-independent parts of $I^{MN}_{zz'}$ are computed. Frequency-dependent potential coefficients of $I^{MN}_{zz'}$ are computed. Admittance parameters based on of $I^{MN}_{zz'}$ are calculated over a frequency sweep.

In another aspect, the invention is a simulator for modeling electromagnetic effects in a planar circuit that employs a plurality of through-silicon vias in a domain. The simulator includes a digital computer and a tangible memory that is readable by the digital computer and that stores a program that causes the digital computer to execute the steps of the method disclosed in the preceding paragraph.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The current system includes the effects of the depletion capacitance and the finite substrate into the framework of an electromagnetic (EM) modeling approach. The EM modeling method, which uses cylindrical modal basis functions to capture current and charge density distributions, is as accurate as generic full-wave EM methods but uses less computational time and memory. Maintaining the advantages, the method is extended by adding depletion regions in the EM formulation and employing the multilayered Green's function. Validations have shown that the method achieves further modeling generality, where the depletion thickness and the oxide/silicon layer thicknesses can be precisely parameterized.

Depletion Region Modeling using Cylindrical Modal Basis Functions

This section focuses on the admittance formulation when TSVs have depletion regions generated by DC bias voltages. The admittances in this section are more accurately calculated with multilayer Green's functions. This method is generally applicable to TSVs with or without oxide liners and depletion regions. This method assumes that the depletion widths are already determined by a specific DC bias condition. To simplify the problem, full-depletion approximation, which enables the direct calculation of depletion width, is assumed. In addition, the method assumes that the shape of depletion regions is a straight cylindrical cell that is concentric to cells for TSVs. Therefore, the axial variation of depletion radius is neglected.

Figure 1:
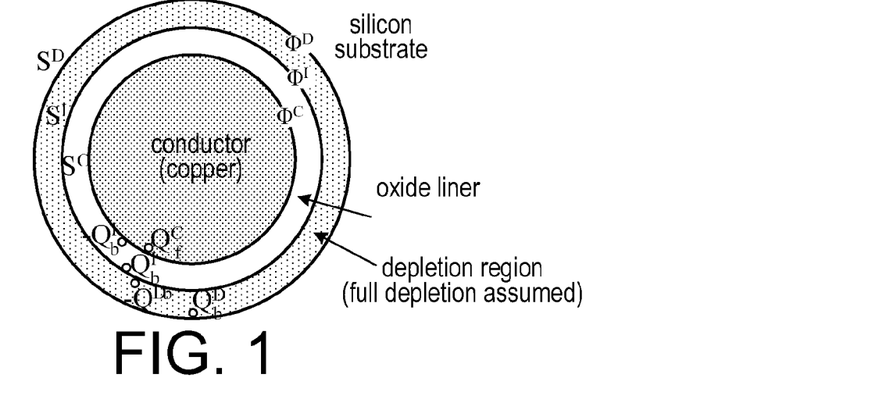
FIG. 1 is a schematic diagram showing TSV details with depletion region. Potential and charge are defined on each surface.

The geometry description of a TSV when a depletion region is formed due to a DC bias voltage is shown in FIG. 1. In addition to the surfaces on copper conductor ($S^C$) and oxide liner ($S^I$), the surface on depletion region ($S^D$) boundary should be considered. Since $S^C$ is a conductor surface, it should satisfy Dirichlet boundary condition. For the other surfaces, Neumann boundary condition should be assigned. The three surfaces $S^c$, $S^I$, and $S^D$ contain total charges $Q^C$, $Q^I$, and $Q^D$, respectively. According to the boundary conditions assigned to the three surfaces, each total charge is composed of free and bound charges as follows:

$$Q^C = Q_f^C - Q_b^I$$

$$Q^I = Q_b^I - Q_b^D$$

$$Q^D = Q_b^D \quad (1)$$

where superscripts 'C', 'I', and 'D' represent conductor, insulator, and depletion region, respectively, and subscripts 'f' and 'b' represent free and bound charge, respectively. Actually, free volume charge, which originates from the governing Poisson's equation, also exists in the depletion region. However, the effect of free volume charges can be neglected when focusing on AC analysis since the free charges depend on the applied DC bias voltage.

Therefore, all the charges in (1) are AC quantities. From (1), the free charge on the conductor surface $S^C$ is:

$$Q_f^C = Q^C + Q_b^I = Q^C + Q^I + Q^D \quad (2)$$

The relation between total charges and potentials on surfaces can be described with the following matrix equation:

$$\begin{pmatrix} P^C & P^{CI} & P^{CD} \\ P^{IC} & P^I & P^{ID} \\ P^{DC} & P^{DI} & P^D \end{pmatrix} \begin{pmatrix} Q^C \\ Q^I \\ Q^D \end{pmatrix} = \begin{pmatrix} \Phi^C \\ \Phi^I \\ \Phi^D \end{pmatrix} \quad (3)$$

where $P^{\{C,D,I\}}$, s are potential coefficient sub-matrices. Element in each sub-matrix can be calculated from the integral equation combined with cylindrical accumulation mode basis functions (AMBFs). Thus, each potential coefficient sub-matrix includes elements obtained from the interaction between the fundamental mode and higher order modes.

Polarization currents $I^{I,pol}$ and $I^{D,pol}$ in the oxide liner region and the depletion region, respectively, can be expressed as follows:

$$I^{I,pol} \approx j\omega C^{I,ex}(\Phi^C - \Phi^I)$$

$$I^{D,pol} \approx j\omega C^{D,ex}(\Phi^I - \Phi^D) \quad (4)$$

where $C^{I,ex}$ and $C^{D,ex}$ are excess capacitances in the oxide liner region and the depletion region, respectively. Although excess capacitances can be calculated by using cylindrical polarization mode basis functions (PMBFs) in the original formulation, they also can be found from the capacitances between $S^C$ and $S^I$ and the capacitances between $S^I$ and $S^D$ as shown below:

$$C^{I,ex} \approx \frac{\varepsilon_{oxide} - \varepsilon_{Si}}{\varepsilon_{Si}} C^{CI} \quad (5)$$

$$C^{D,ex} \approx \frac{\varepsilon_{Si,depletion} - \varepsilon_{Si}}{\varepsilon_{Si}} C^{DI}$$

The values of capacitances $C^{CI}$ and $C^{DI}$ can be obtained from the matrix relation (3). The polarization currents can be related to bound charges by the following continuity equations:

$$I^{I,pol} - j\omega Q_b^I = 0$$

$$I^{D,pol} - j\omega D_b^D = 0 \quad (6)$$

By combining (4) and (6), one can obtain the relations between bound charges and potentials:

$$Q_b^I = C^{I,ex}(\Phi^C - \Phi^I)$$

$$Q_b^D = C^{D,ex}(\Phi^I - \Phi^D) \quad (7)$$

With the above formulas, one can derive the following matrix equation (8) that relates the free charge on the conductor surface and potentials on the conductor, the oxide liner, and the depletion region.

$$\begin{pmatrix} Q_f^C \\ 0 \\ 0 \end{pmatrix} = \begin{pmatrix} C^C + C^{I,ex} & C^{CI} - C^{I,ex} & C^{CD} \\ C^{IC} - C^{I,ex} & C^I + C^{I,ex} + C^{D,ex} & C^{ID} - C^{D,ex} \\ C^{DC} & C^{DI} - C^{D,ex} & C^D + C^{D,ex} \end{pmatrix} \begin{pmatrix} \Phi^C \\ \Phi^I \\ \Phi^D \end{pmatrix} \quad (8)$$

$$\text{where } \begin{pmatrix} C^C & C^{CI} & C^{CD} \\ C^{IC} & C^I & C^{ID} \\ C^{DC} & C^{DI} & C^D \end{pmatrix} = \begin{pmatrix} P^C & P^{CI} & P^{CD} \\ P^{IC} & P^I & P^{ID} \\ P^{DC} & P^{DI} & P^D \end{pmatrix}^{-1}.$$

Figure 2:
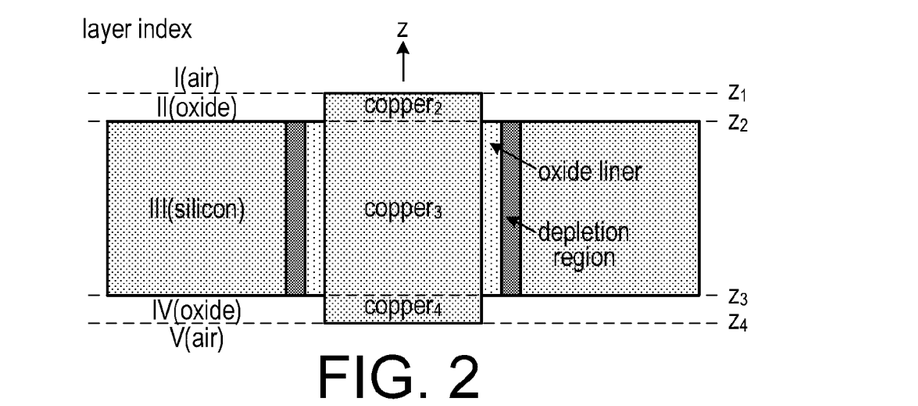
FIG. 2 is a schematic diagram showing layers defined over a silicon substrate and TSV segments to calculate scalar potential kernels

Equation (8) is the extension of the equivalent capacitance matrix equation presented in. In general, the sizes of the potential vectors $\Phi^C$, $\Phi^I$, and $\Phi^D$ are not equal because $\Phi^C$ includes the potentials of additional conductor sections in oxide layers, as shown in FIG. 2. In addition, one may need to consider the cases when some TSVs do not have either oxide liners or depletion regions. Thus, zero vectors are augmented to match the sizes of matrices when adding sub-matrices in (8). Since the formulations for conductor impedance and the continuity relation on the conductor surface remain the same, the formulation can be modified for TSVs with depletion region by just replacing the original capacitance matrix with the following:

$$C^{eq} = (E \quad 0) [C_C^{eq} - C_{CX}^{eq} C_X^{eq-1} C_{XC}^{eq}] \begin{pmatrix} E \\ 0 \end{pmatrix} \quad (9)$$

where E is an identity matrix and, $$C_C^{eq} = C^C + C^{I,ex},$$

-continued $$C_{CX}^{eq} = (C^{CI} - C^{I,ex} \quad C^{CD}),$$

$$C_X^{eq} = \begin{pmatrix} C^I + C^{I,ex} + C^{D,ex} & C^{ID} - C^{D,ex} \\ C^{DI} - C^{D,ex} & C^D + C^{D,ex} \end{pmatrix}, \text{ and}$$

$$C_{XC}^{eq} = \begin{pmatrix} C^{IC} - C^{I,ex} \\ C^{DC} \end{pmatrix}.$$

The equivalent capacitance (9) can be inserted to the following equation, which relates the terminal currents and potentials:

$$(Y_e + j\omega C^{eq})\Phi^C = \begin{pmatrix} I_t \\ 0 \end{pmatrix}, \quad (10)$$

where matrix $Y_e$ is computed from the impedance of copper conductors. Equation (10) leads to an impedance (Z-) parameter matrix equation, which can be converted to the corresponding scattering (S-) parameter matrix relation.

Substrate Effect Modeling using Layered Media Green's Function

The potential coefficients discussed in the previous section and impedances of conductors can be computed by surface and volume integrations, respectively, which involve cylindrical modal basis functions with Green's functions. To extract the accurate effect of a finite silicon substrate from the integral equations, multilayered Green's functions should be used, in the partial element equivalent circuit (PEEC) method with dyadic Green's functions. Since computing the multilayered Green's functions requires considerable time and memory, this section focuses on methods that maximize computational efficiency using the cylindrical modal basis functions.

Multilayered Green's Functions for Admittance Calculation

For the computation of capacitance and conductance of TSVs in a silicon substrate, the following scalar potential kernel can be used in the scalar potential integral equation (SPIE):

$$K_\phi^{MN} = j \frac{\omega}{2\pi} \int_0^\infty \frac{1}{k_p} (\tilde{G}_{MN}^{V_e} - \tilde{G}_{MN}^{V_h}) J_0(k_p \zeta) dk_p, \quad (11)$$

where M and N are layer indices, $\xi = \sqrt{(x-x')^2 + (y-y')^2}$ is the radial distance between the source and the observation points on a plane, $J_0(-)$ is the Bessel function of order 0, $\tilde{G}_{MN}^{V_q}(z,z')$ is the transmission line Green's function, and q is a subscript indicating whether each Green's function is constructed with TM-('e') or TE-type ('h') transmission line. $\tilde{G}_{MN}^{V_q}(z,z')$, which represents the voltage at a point z in the layer M due to a unit-strength current source at a point z' in the layer N, can be obtained by calculating an equivalent impedance in the cascaded transmission line sections that model the given layered media.

The scalar potential kernels are calculated with five layers defined over a substrate, as shown in FIG. 2. Since the copper via in the TSV structure penetrates all the layers, it is divided into three sections: a section in the upper oxide layer (copper$_2$), a section in the middle silicon layer (copper$_3$), and a section in the lower oxide layer (copper$_4$). The oxide liner and the depletion region are located in layer III only. Since each section does not penetrate any of the layer interfaces, it is not necessary to consider the contour integral arising from the discontinuity of the potential kernel.

Prior to the integral over the spectral domain, the integration of the transmission line Green's function $\tilde{G}_{mi}^{V_q}(z, z')$ over z- and z'-coordinates can be calculated analytically in spectral domain since the transmission line Green's function is a combination of exponential functions of (z, z'). Thus, the Integration for potential coefficients between the k-th and the l-th cells can be expressed as shown below:

$$P_{k,l} = \int_{S_l}\int_{S_k} v_k v_l I_{zz'}^{MN}(\omega)\,dS_k\,dS_l, \quad (12)$$

where $$I_{zz'}^{MN}(\omega, \rho) =$$

$$j\frac{\omega}{2\pi}\int_0^\infty \frac{1}{k_\rho}\int_{Z_{N1}}^{Z_{N2}}\int_{Z_{M1}}^{Z_{M2}}(\tilde{G}_{MN}^{V_e} - \tilde{G}_{MN}^{V_h})\,dz\,dz'\,J_0(k_\rho\zeta)\,dk_\rho$$

and $v_k$ and $v_l$ are cylindrical AMBFs. Once the substrate layer configuration is defined, $I^{MN}_{zz'}$ can be calculated for a few intervals bounded by layer interfaces. In the configuration shown in FIG. 2 for example, the intervals for axial coordinate integrations are $[z_1, z_2]$, $[z_2, z_3]$, and $[z_3, z_4]$.

Integration for partial potential coefficients with the scalar potential kernel is computationally expensive since the kernel itself is involved with Sommerfeld integral over the spectral domain, which needs to be computed for every frequency point. Although several techniques such as matrix pencil method and direct complex image method (DCIM) have been proposed to speed up the Sommerfeld integral or approximate the Green's function, they are not applicable for the lossy silicon substrate. For example, the series expression of the Green's function obtained from DCIM requires a large number of image terms for convergence when the magnitude of complex permittivity is large as in the case of silicon substrate. Furthermore, it is important that rigorous integration should be used to obtain a high-frequency substrate model due to the recent trend of TSVs towards higher frequencies.

To address the computational issue, a method that approximates Green's function in small localized intervals is used. The method utilizes the fact that the range of intervals for radial variable (ρ) is small compared to the entire domain occupied by the collection of TSVs. Because of the localized domain property of the interconnection problem, piecewise approximations over the small localized intervals are available, without the need for approximating the Green's function over the entire domain. In the beginning of the computation, the minimum and the maximum values in each interval are determined for each partial element computation. Then, the sampled values of Green's functions are stored for the collection of the minimum and the maximum values. During the partial element calculation, an approximate expression of the Green's function is found and included in the integration. For the approximate expression, the following logarithmic function or polynomial can be used:

$$I_{zz'}^{MN}(\omega, \rho) = \begin{cases} A(\omega)\ln\rho + B(\omega) & \rho \in I_1 \\ A(\omega)\rho^2 + B(\omega)\rho + C(\omega) & \rho \in I_2 \end{cases} \quad (13)$$

The intervals $I_1$ and $I_2$ are determined by testing where the approximation is closer to the sampled values of the Green's function. Based on several numerical experiments, it has been found that a logarithmic function can be used over a small distance or at low frequencies. At a large distance or at higher frequencies, where the Green's function exhibits an oscillatory behavior, a second-order polynomial can be used to approximate over local intervals.

Figure 3:
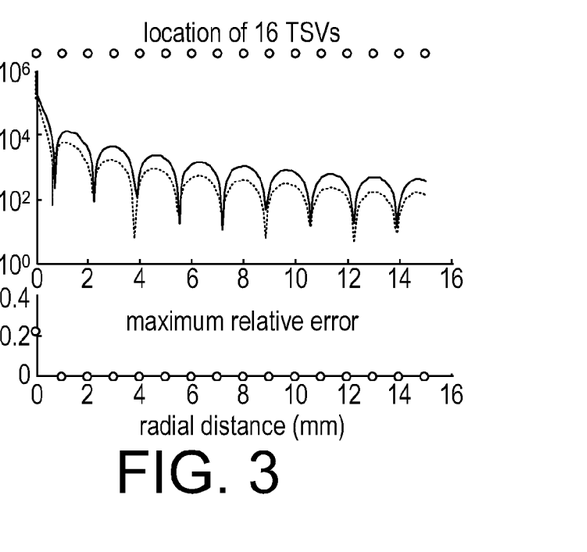
FIG. 3 is a graph showing multilayered Green's function (solid: real, dashed: imaginary) integrated over the axial variables and the maximum relative error of the localized approximation to the Green's function for 16 TSVs allocated over a 15 mm span.

An example of sampling Green's function values and the results of approximations is shown in FIG. 3, where 16 TSVs are regularly placed along a straight line. The maximum distance to be handled is about 15 mm, which is sufficiently large compared to the typical die size. The diameter of each TSV is 30 μm, which is the same as the size of each local interval. In FIG. 3, Green's function for region III is plotted over the radial distance at 20 GHz, with the maximum relative error of approximated values for each interval. For all the domains, the approximations show good agreement with the originally computed Green's function since the error relative to the maximum magnitude of Green's function is less than 0.25%.

Figure 4:
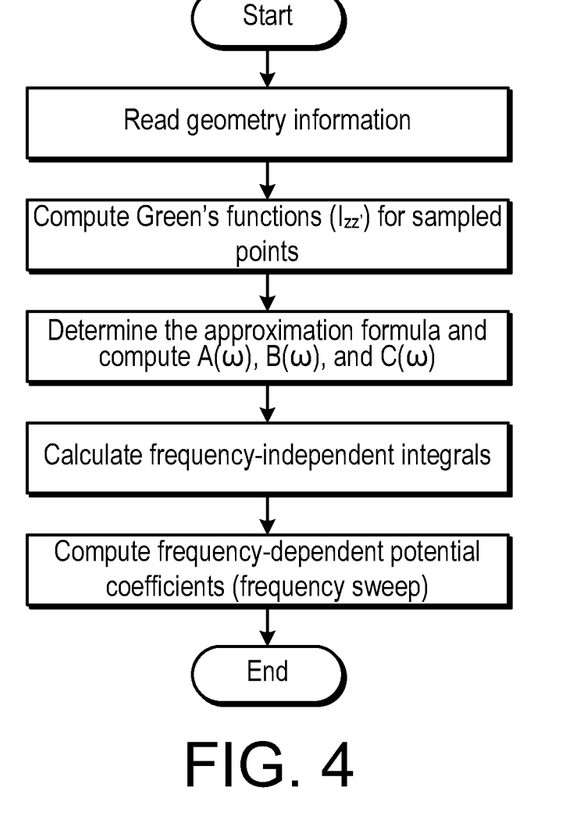
FIG. 4 is a flowchart showing a method for calculating multilayered Green's functions and potential coefficients

Before the frequency sweep to compute potential coefficients, the frequency-independent parts of $I^{MN}_{zz'}$ in (13) can be combined with cylindrical AMBFs and integrated analytically or numerically. During the frequency sweep, the coefficients A(ω), B(ω), and C(ω) in (13), which are determined beforehand from the sampled Green's functions, are multiplied with the frequency-independent terms and then combined to produce the potential coefficients of the fundamental and the higher order modes. The flowchart shown in FIG. 4 summarizes the entire procedure for admittance parameter calculation.

Green's Function for Impedance Calculation

For inductance and resistance calculations for a general layered media, a dyadic Green's function should be used. When assuming only the z-directional currents exist as in vertical interconnections, three elements of the dyadic kernel interact with the z-directional current density. With the three elements, additional computations for Sommerfeld integral and integrals for partial impedance calculation are required. However, as long as identical permeability for the entire multilayer domain is used, the free-space Green's function can be used without loss of accuracy, since the Faraday field is not influenced by the dielectric interfaces for the quasi dynamic case. Therefore, the same procedure can be used to compute inductances and resistances.

EXAMPLES

Three experimental examples will now be discussed. In a first example, a TSV pair is characterized with varying geometry parameters to assess the accuracy and the performance of the method and to present an equivalent circuit model. In a first example, a three-TSV structure is modeled, where signal propagation and crosstalk characteristics in time domain are observed. In a third example, a 10-by-10 TSV array is characterized to show the scalability of the method.

Example 1

A TSV Pair with Depletion Regions

Figure 5A:
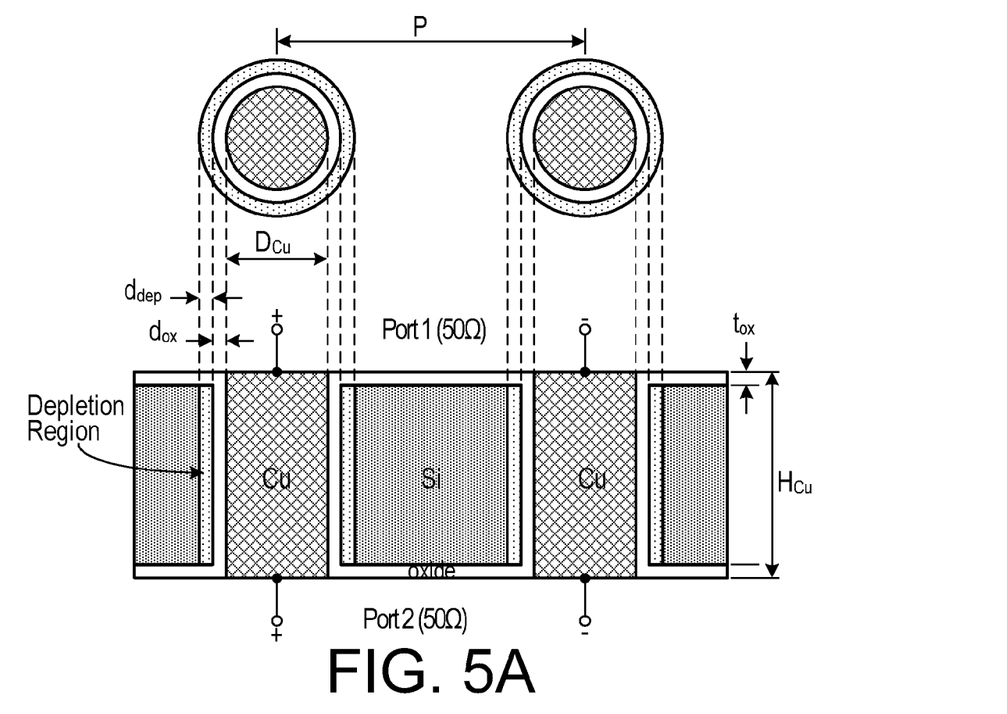
FIG. 5A is a schematic diagram showing a definition of geometric parameters.

A TSV pair with main geometry parameters indicated is shown in FIG. 5. Diameter ($D_{Cu}$), pitch (P), and oxide liner thickness ($d_{ox}$) are fixed to 30 μm, 50 μm, and 0.1 μm, respectively. Except for the last two cases of TSVs in this subsection, the total substrate thickness ($H_{Cu}$) is 100 µm, and silicon conductivity is 10 S/m.

Figure 6:
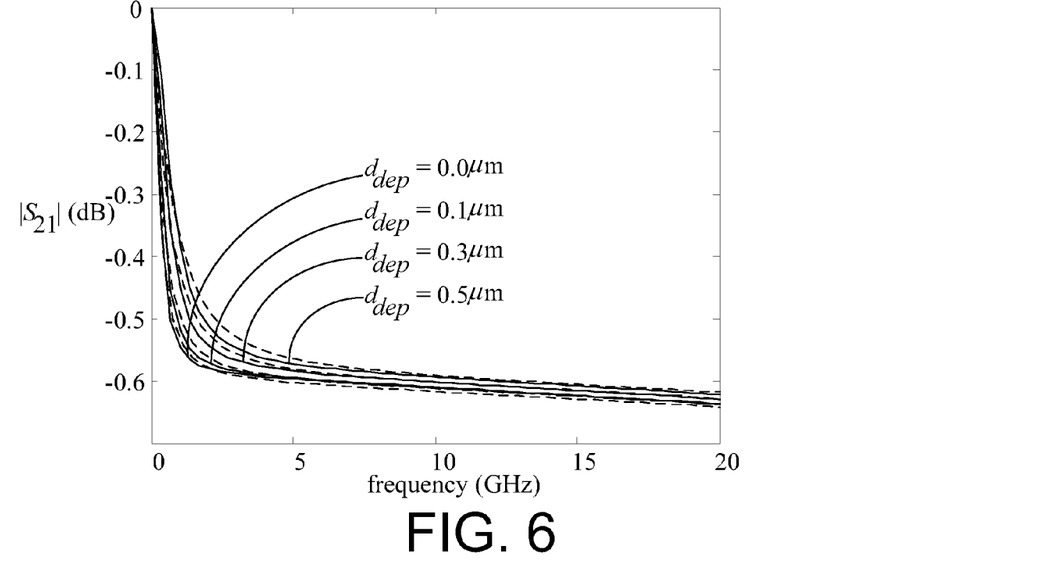
FIG. 6 is a graph showing insertion losses of the TSV pair in FIG. 5 with the variation of depletion region thickness ($d_{dep}$). Dashed lines are insertion losses obtained from HFSS simulations.

Scattering parameters of the TSV pair up to 20 GHz for the increased depletion thickness ($d_{dep}$) are shown in FIG. 6. Difference in the magnitudes of insertion loss is more emphasized up to the low-to-mid frequency range of 5 GHz, but the effect of varying depletion thickness becomes smaller at high frequencies, where the substrate admittance is more dominant. Correlations with HFSS simulation results confirm the accuracy of the method.

Figure 5B:
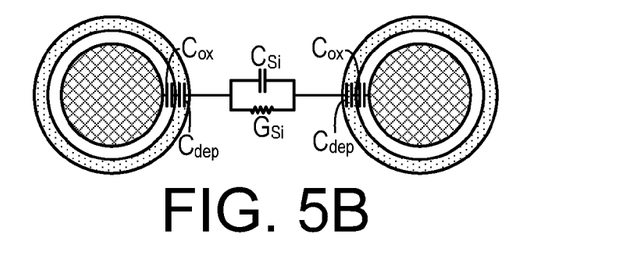
FIG. 5B is a schematic diagram showing main capacitances and conductance of equivalent circuit.
Figure 7:
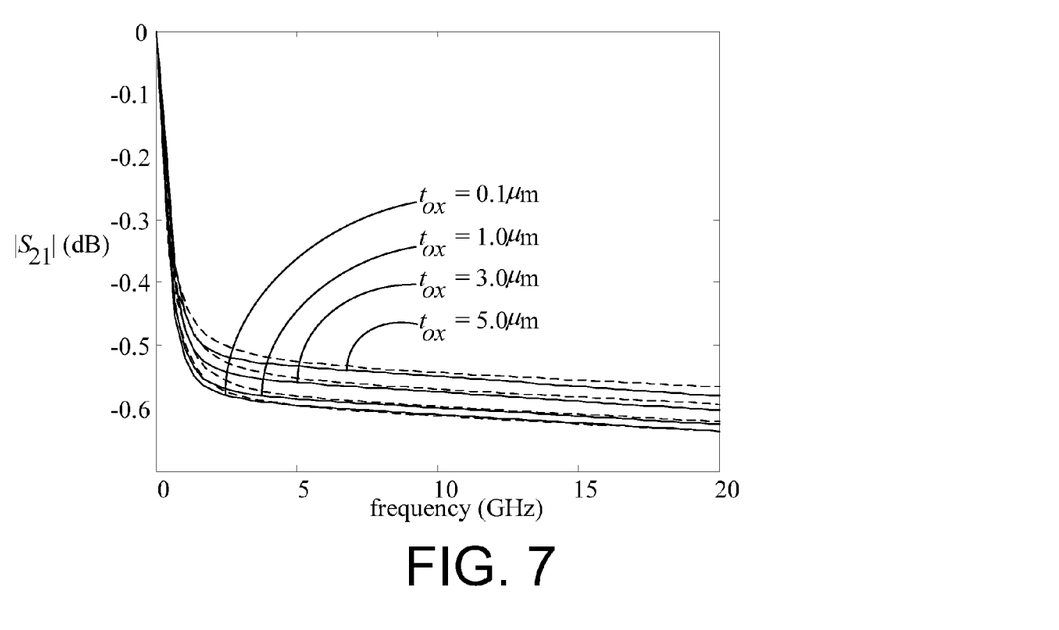
FIG. 7 is a graph showing insertion losses of the TSV pair in FIG. 5 with the thickness of oxide layers ($t_{ox}$). Dashed lines are insertion losses obtained from HFSS simulations.

The effect of the varying oxide layer thickness (tox) on the transmission response when the depletion thickness ($d_{dep}$) is fixed to 0.1 um is shown in FIG. 7. Since the total thickness of silicon substrate ($H_{Cu}$) is constant, the thickness of silicon layer ($H_{Cu}$-$2_{tox}$) is reduced as the oxide layer thickness increases. The increase in the oxide layer thickness improves the transmission characteristic as the depletion thickness does, but a different behavior results where the reduced insertion loss is maintained up to high frequencies. This behavior means that the effective length of TSVs is dominated by the partial length of TSVs covered by the bulk silicon layer. Table I summarizes the main circuit elements, which are defined in FIG. 5B, for the eight cases shown in FIG. 6 and FIG. 7.

TABLE I

EQUIVALENT CIRCUIT ELEMENTS OF TSV PAIRS

| parameters | | $C_{ox}$ (pF) | $C_{dep}$ (pF) | $G_{Si}$ (mS) | $C_{Si}$ (fF) |
|---|---|---|---|---|---|
| $t_{ox}$ = 0.1 um, | $d_{dep}$ = 0 um | 3.27 | N/A | 3.42 | 35.2 |
| $H_{Cu}$ = 100 um, | $d_{dep}$ = 0.1 um | 3.27 | 10.03 | 4.25 | 42.3 |
| $\sigma_{Si}$ = 10 S/m | $d_{dep}$ = 0.3 um | 3.27 | 3.37 | 4.36 | 43.3 |
| | $d_{dep}$ = 0.5 um | 3.27 | 2.03 | 4.48 | 44.4 |
| $d_{dep}$ = 0.1 um, | $t_{ox}$ = 0.1 um | 3.27 | 10.03 | 4.25 | 42.3 |
| $H_{Cu}$ = 100 um, | $t_{ox}$ = 1.0 um | 3.21 | 9.86 | 4.18 | 41.6 |
| $\sigma_{Si}$ = 10 S/m | $t_{ox}$ = 3.0 um | 3.08 | 9.47 | 4.01 | 39.7 |
| | $t_{ox}$ = 5.0 um | 2.96 | 9.08 | 3.84 | 37.8 |
| $d_{dep}$ = 0.0 um, | method | 0.32 | N/A | 11.83 | 4.30 |
| $t_{ox}$ = 0.1 um, | analytic formula | 0.32 | N/A | 14.00 | 2.95 |
| $H_{Cu}$ = 10 um, | | | | | |
| $\sigma_{Si}$ = 500 S/m | | | | | |

The elapsed simulation time and the maximum memory used for the method and the HFSS simulation for the previous cases are compared and summarized in Table II. All the simulations were performed under the environment of Intel® Core™ i7-3770 3.40 GHz CPU with 16 GB RAM, but a single core was permitted for the method to simplify the performance measurement. Both the method and the HFSS simulation include the frequency sweep up to 20 GHz with 60 frequency points. Although additional computational resources for handling multilayered Green's functions are required, Table II shows that the method is more efficient in memory and execution time than the generic full-wave EM solvers for modelling TSV interconnections. The main origin of a relatively large computation time for the full-wave EM solver is the fine meshing required for the oxide liners and the oxide layers.

TABLE II

PERFORMANCE COMPARISON OF THE METHOD AND HFSS FOR TSV PAIR EXAMPLES

| | | method | | HFSS | |
|---|---|---|---|---|---|
| parameters | | time (sec.) | memory (MB) | time (sec.) | memory (GB) |
| $t_{ox}$ = 0.1 um, | $d_{dep}$ = 0 um | 1,033 | 6.13 | 19,592 | 7.7 |
| $H_{Cu}$ = 100 um, | $d_{dep}$ = 0.1 um | 1,093 | 7.77 | 48,376 | 14.3 |
| $\sigma_{Si}$ = 10 S/m | $d_{dep}$ = 0.3 um | 1,103 | 9.58 | 42,872 | 14.2 |
| | $d_{dep}$ = 0.5 um | 1,109 | 7.18 | 28,067 | 11.7 |
| $d_{dep}$ = 0.1 um, | $t_{ox}$ = 0.1 um | 1,095 | 7.63 | 48,376 | 14.3 |
| $H_{Cu}$ = 100 um, | $t_{ox}$ = 1.0 um | 1,094 | 8.82 | 15,688 | 6.67 |
| $\sigma_{Si}$ = 10 S/m | $t_{ox}$ = 3.0 um | 1,095 | 8.31 | 7,853 | 4.13 |
| | $t_{ox}$ = 5.0 um | 1,102 | 6.92 | 7,159 | 3.42 |

Figure 8:
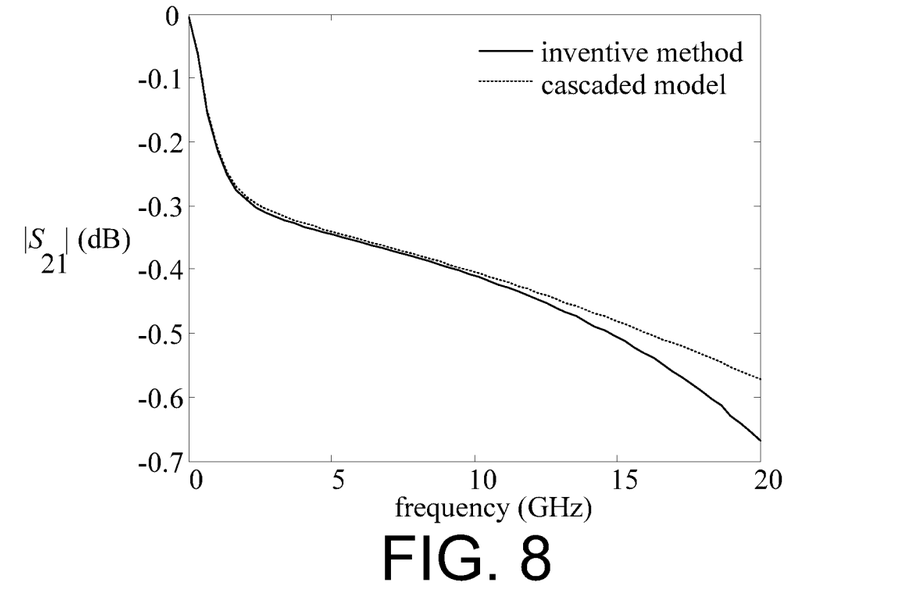
FIG. 8 is a graph showing the effect of the coupling from copper vias in oxide layers ($t_{ox}$=475 µm, $H_{Cu}$=1,000 um, $d_{ox}$=0.1 µm, $d_{dep}$=0.5 µm, $D_{Cu}$=30 µm, P=50 µm, $\sigma_{Si}$=10 S/m).

The effect of the copper vias in the oxide layers can be observed by increasing their length. The response from a structure is shown in FIG. 8, where the copper via length is 475 µm and the length of TSVs is 50 µm. To verify the effect of coupling between the copper vias and the TSVs, FIG. 8 compares the response from the method and the response from an approximate cascaded model. Since the cascaded model is generated by connecting separately simulated copper via sections and a TSV section in a circuit simulator, the coupling effect is not considered. The missing of the copper via to TSV coupling results in the deviation from the response obtained from the method, which includes the accurate coupling effect.

Figure 9:
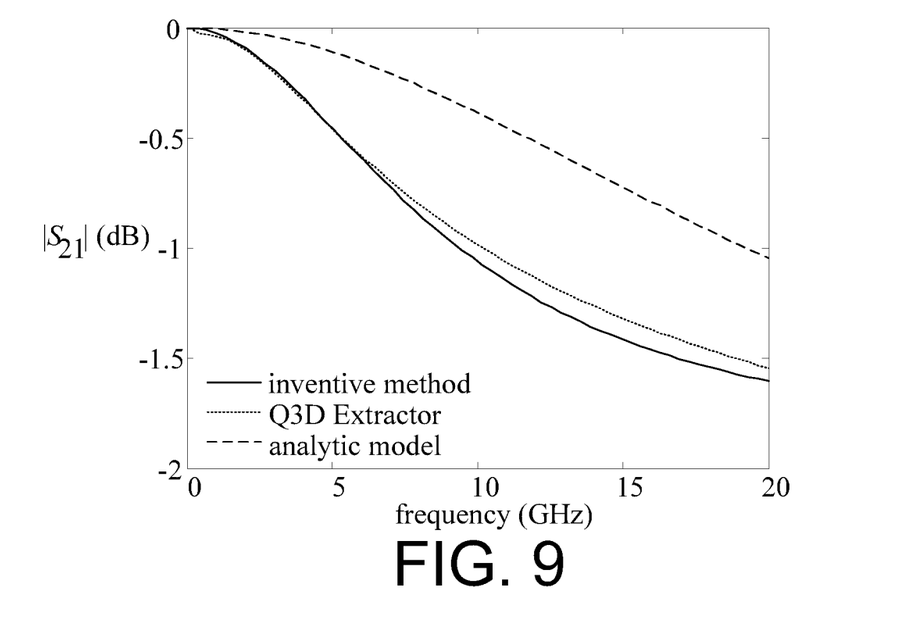
FIG. 9 is a graph showing a comparison of frequency responses for a short length (10 µm) and a high silicon conductivity (500 S/m)

The following case is a TSV pair in a thin silicon substrate, where capturing the finite layer effect is especially important for accuracy. The thickness of the substrate is 10 µm, and the silicon conductivity of 500 S/m is assigned to magnify the insertion loss. Without a depletion region ($d_{dep}$=0 µm), the thickness of the oxide liner is 0.1 µm. As shown in FIG. 9, the response obtained from the method is compared with that from Q3D Extractor. The method is well correlated with Q3D Extractor data at least up to 6 GHz. FIG. 9 also shows that the response from a popularly used analytical formula is different from the results from the method and Q3D Extractor. The main reason of the discrepancy is found in Table I, where the conductance and the capacitance of analytical formula, which is based on the 2-D transmission line model, may not be accurate for the short TSVs. Since recent progress in TSV process aims to reduce the thickness of silicon substrate, the accuracy improvement for short TSVs by the method is especially important.

Example 2

Coupling between Two TSV Pairs

Figure 10:
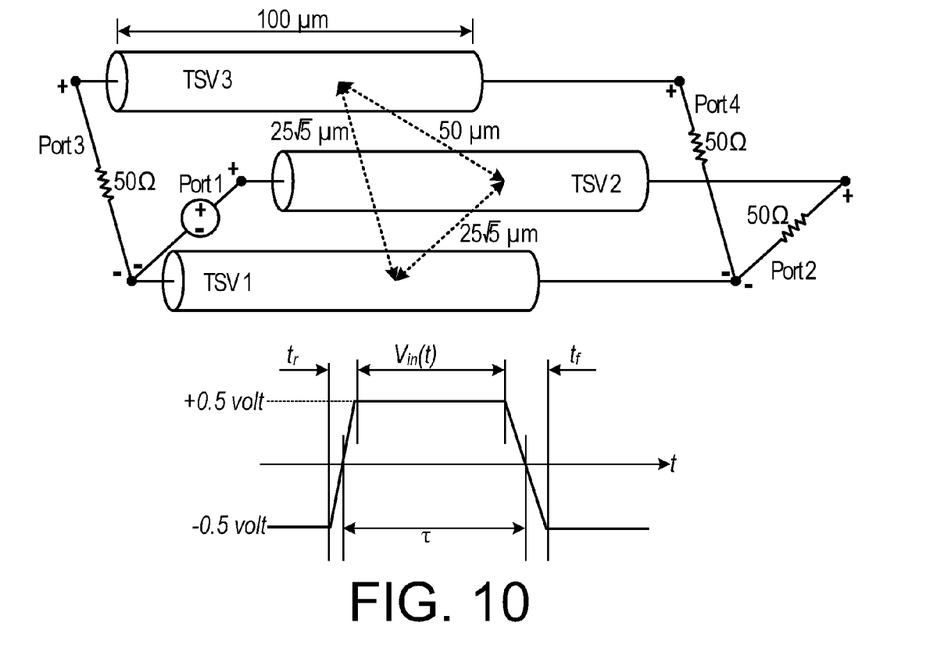
FIG. 10 is a schematic diagram showing configuration of two interconnection channels formed by three TSVs and the waveform of excitation voltage.

Since the depletion depth can be varied through an applied DC voltage, one can utilize this property for adaptive interconnection design. A three-TSV configuration in this subsection is presented as an example. The diameter ($D_{Cu}$) and the oxide liner thickness ($d_{ox}$) of all TSVs are 30 µm and 0.1 µm, respectively. The depletion thickness of TSV 2 and TSV 3 is 0.5 µm, but TSV 1 does not have a depletion region. The oxide layer thickness ($t_{ox}$) is 0.1 µm. As shown in FIG. 10, TSV 2 and TSV 3 share TSV 1 as a return path. FIG. 10 also shows a time-domain simulation setup with the excitation voltage waveform. This assumes that each TSV is biased by a separate DC voltage to form a depletion region but the bias voltages are not indicated in FIG. 10.

Figure 11:
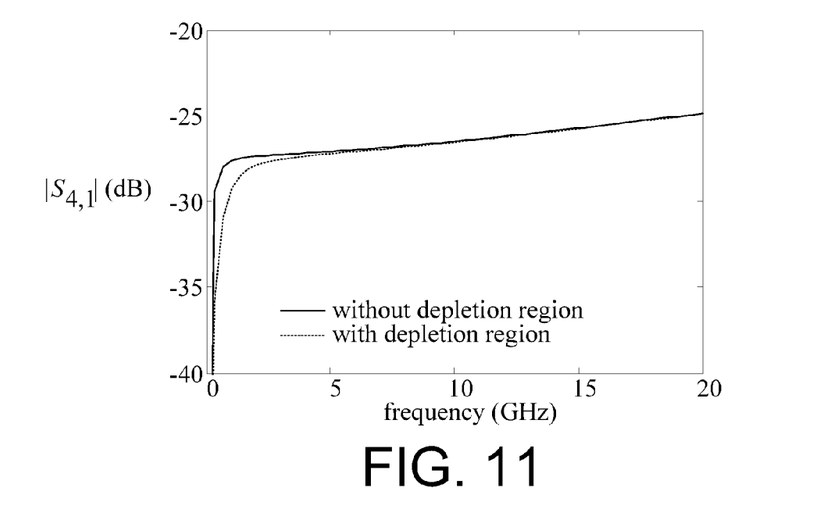
FIG. 11 is a graph showing far-end crosstalk ($S_{4,1}$) characteristics in frequency domain.
Figure 12:
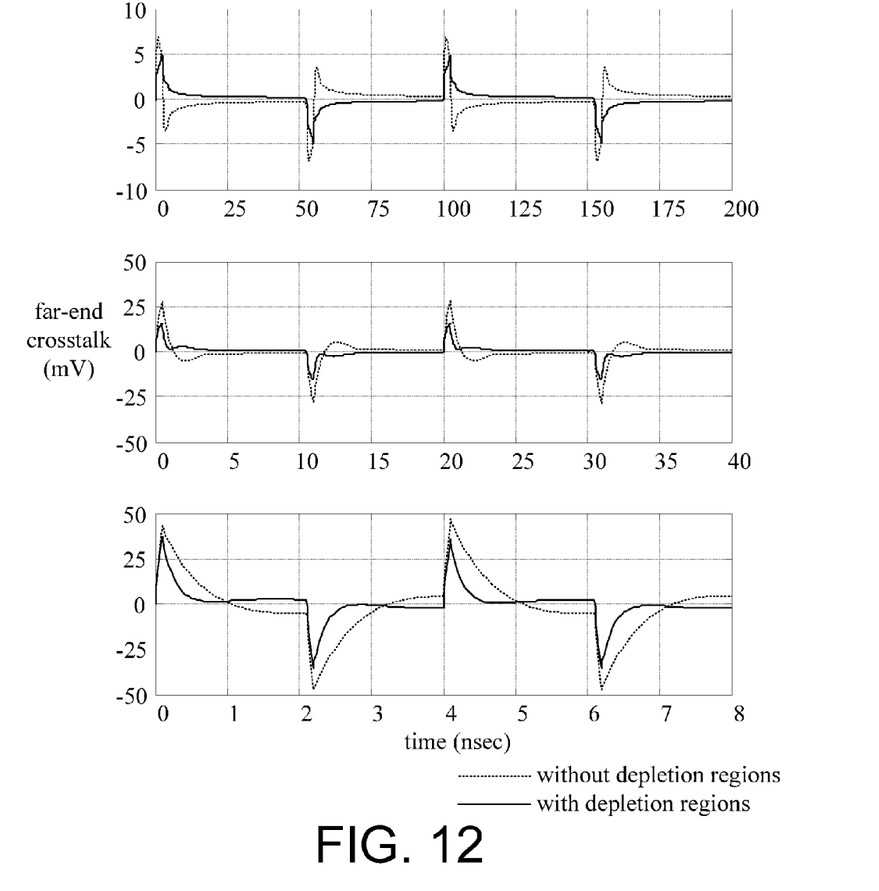
FIG. 12 is a series of graphs showing time-domain waveforms of far-end crosstalk for three pulse train input waveforms (top: $\tau$=50 nsec $t_r$=2.5 nsec, middle: $\tau$=10 nsec $t_r$=0.5 nsec, bottom: $\tau$=2 nsec $t_r$=0.1 nsec) for without and with depletion regions.

The far-end crosstalk responses for two cases in frequency and time domains, respectively are shown in FIG. 11 and FIG. 12. Although not shown, near-end crosstalk waveforms exhibit similar behaviors with those of the far-end crosstalk. Due to decreased capacitive coupling, the TSVs with depletion regions are less vulnerable to the aggressor excitation. The reduced coupling effects is especially noticeable during slow transients since coupling levels are different mainly in low frequencies up to 5 GHz, as observed in FIG. 11. The level of crosstalk peak is the highest for the fastest signal ($\tau$=2 nsec, $t_r$=0.1 nsec), but the level of undershoot shown in the cases without the depletion regions is relatively higher for the slowest signal ($\tau$=50 nsec, $t_r$=2.5 nsec). An important characteristic to observe is the long-tail response, which originates from the resistive behavior of the substrate.

Example 3

10-by-10 TSV Array

Figure 13:
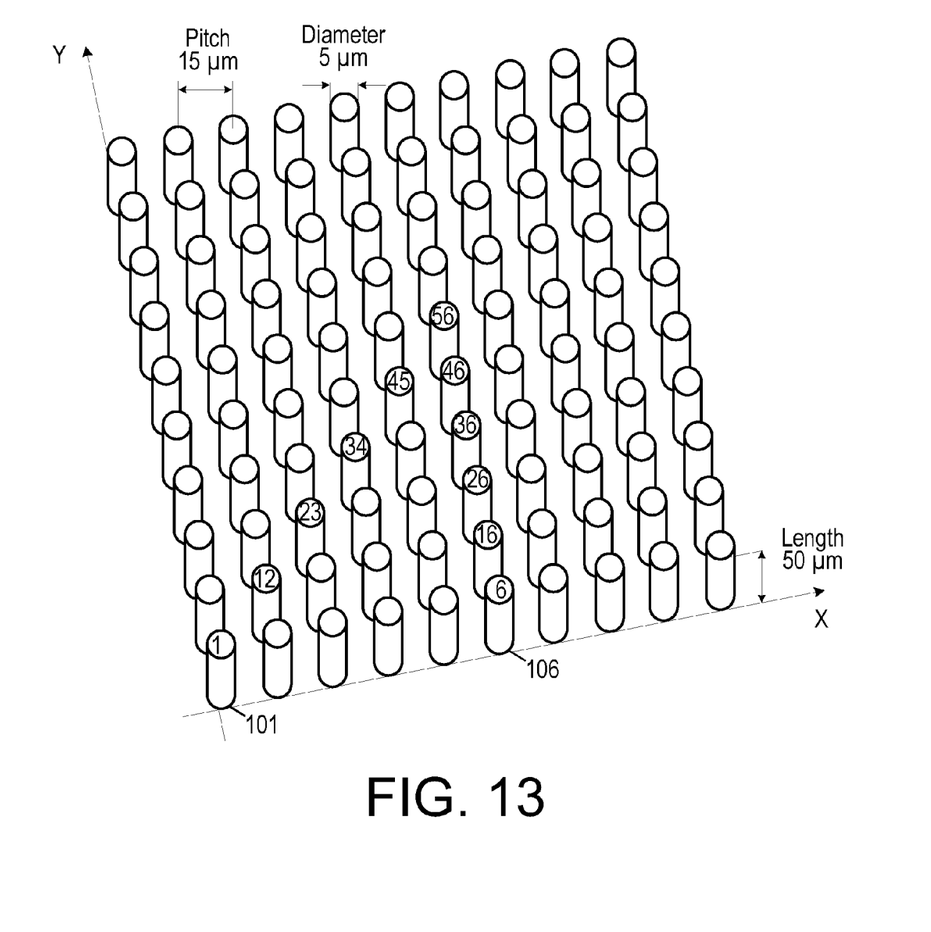
FIG. 13 is a schematic diagram showing a 10-by-10 TSV array with port designation.

The final example is an array composed of 100 TSVs, which is constructed to demonstrate the capability of handling a large TSV structure in real 3-D ICs using the method. The configuration of the array is shown in FIG. 13, where all TSVs are assumed to be signal TSVs. With the main geometric parameters in FIG. 13, three different cases are simulated: 1) $d_{dep}$=0 μm, tox=0.1 μm; 2) $d_{dep}$=0.3 μm, $t_{ox}$=0.1 μm; and 3) $d_{dep}$=0 μm, $t_{ox}$=3 um. For all cases, the diameter of copper via is 5 μm, the thickness of the entire silicon substrate is 50 μm, and the oxide liner thickness is 0.1 μm. Although the elapsed time for simulating the three cases is considerable, the method can provide the response of these large structures that generic EM simulation tools cannot handle.

Figure 14:
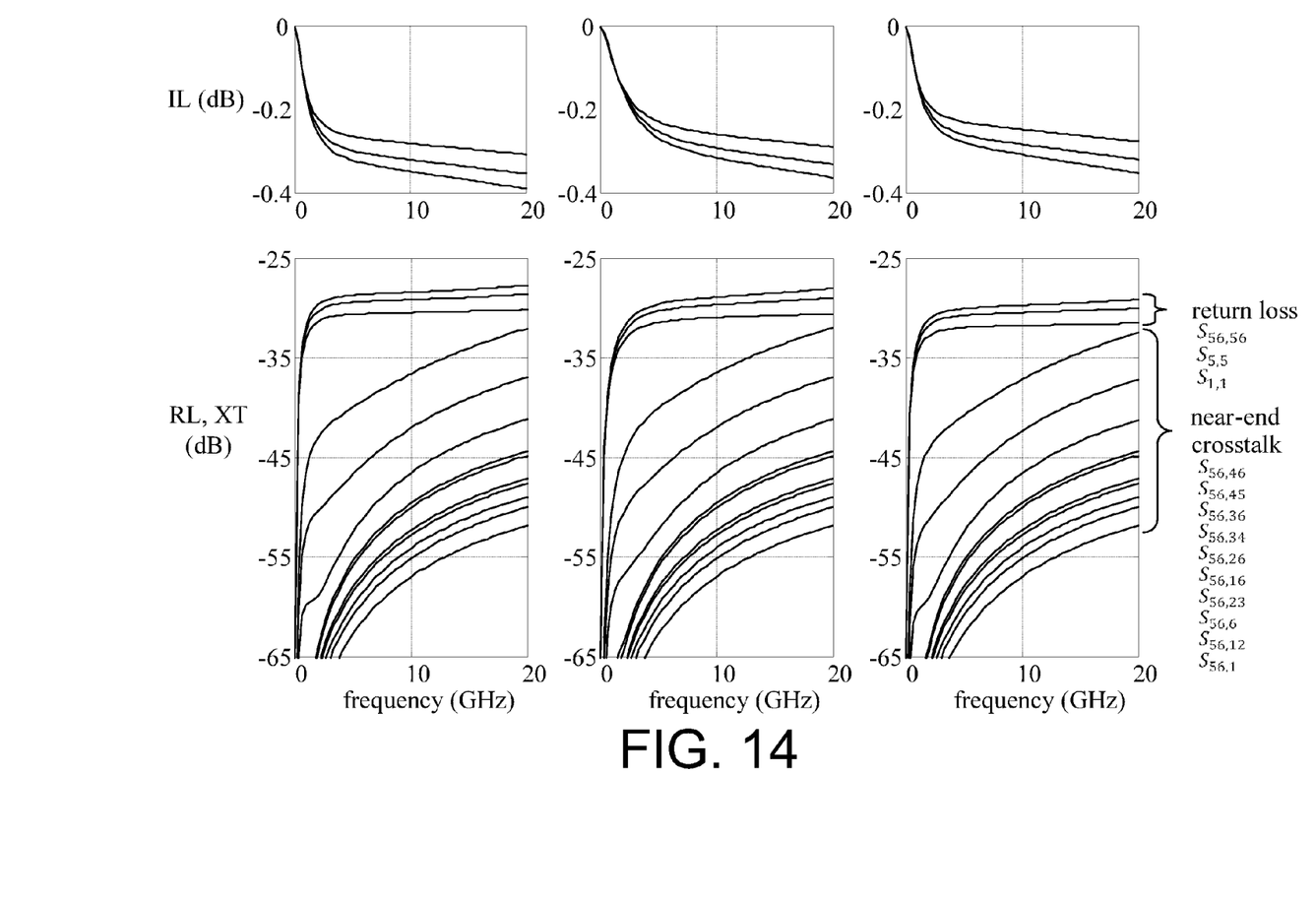
FIG. 14 is a series of graphs showing: insertion loss, return loss, and crosstalk for 1 0-by-1 0 TSV arrays.

The insertion loss (IL), the return loss (RL), and the near-end couplings (XT) for the three cases is shown in FIG. 14. As presented in the characterization of other via or TSV array structures, the frequency responses differ for the location of each TSV in the array configuration. For example, TSVs located near to the center of array have a higher insertion loss than TSVs located around the edge and the corner of the array because the center TSV experiences higher resistive coupling from its neighboring TSVs. The effects of depletion regions and oxide layer on top and bottom are properly captured as well, although their variations with different depletion and oxide layer conditions do not influence the coupling level considerably. The modeling method is also applicable to any irregular TSV distribution of a similar size.

The method offers an improved EM modeling method for TSVs to keep up with the recent design and modeling requirements. In the framework of the modeling method based on integral equations combined with cylindrical modal basis functions, the method enables the modeling of the effect of depletion region surrounding TSVs by an additional excess capacitance. For more accurate modeling, the finite thickness of $SiO_2$—Si—$SiO_2$ substrate is considered by employing the multilayer Green's functions. The computational load for calculating Green's function was relieved by using the approximations of Green's function over localized intervals. The method is expected to provide more efficient and accurate TSV models that can be practically used for today's 3D IC prototyping.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method for modeling electromagnetic effects in a circuit that employs a plurality of through-silicon vias in a domain, comprising the steps of:
    (a) describing a region around each through-silicon via in terms of a cylindrical accumulation mode basis function;
    (b) incorporating the cylindrical accumulation mode basis function into an equivalent circuit that describes selected electrical characteristics of each through-silicon via;
    (c) selecting a plurality of localized intervals around each through-silicon via;
    (d) approximating a Green's function for $I^{MN}_{zz'}$ (wherein M and N identify selected layers and wherein zz' designates layer boundaries in a layer through which the through-silicon via passes) in each localized interval without approximating the Green's function over the entire domain as part of a partial element computation;
    (e) approximating the coefficients of A($\omega$), B($\omega$) and C($\omega$) of a logarithmic function describing $I^{MN}_{zz'}$ over a predetermined range of frequencies ($\omega$);
    (f) computing frequency-independent parts of $I^{MN}_{zz'}$;
    (g) computing frequency-dependent potential coefficients of $I^{MN}_{zz'}$; and
    (h) calculating admittance parameters based on of $I^{MN}_{zz'}$ over a frequency sweep.

2. The method of claim 1, wherein the Green's function comprises a multilayer Green's function.

3. The method of claim 1, wherein $I^{MN}_{zz'}$ is given by $$P_{k,l} = \int_{S_l}\int_{S_k} v_k v_l I^{MN}_{zz'}(\omega) dS_k dS_l,$$

where $$I^{MN}_{zz'}(\omega,\rho) = j\frac{\omega}{2\pi}\int_0^\infty \frac{1}{k_\rho}\int_{Z_{N1}}^{Z_{N2}}\int_{Z_{M1}}^{Z_{M2}}(\tilde{G}^{V_e}_{MN} - \tilde{G}^{V_h}_{MN})dz\,dz' J_0(k_\rho\zeta)dk_\rho$$

and where $v_k$ and $v_l$ are cylindrical accumulation mode basis functions.

4. The method of claim 1, wherein the logarithmic functions comprises:

$$I^{MN}_{zz'}(\omega,\rho) = \begin{cases} A(\omega)\ln\rho + B(\omega) & \rho \in I_1 \\ A(\omega)\rho^2 + B(\omega)\rho + C(\omega) & \rho \in I_2 \end{cases}.$$

5. The method of claim 4, the logarithmic function describing $I^{MN}_{zz'}$ includes a plurality of frequency-independent parts.

6. The method of claim 5, wherein frequency-independent parts of $I^{MN}_{zz'}$ are combined with cylindrical accumulation mode basis functions and integrated analytically.

7. The method of claim 5, wherein frequency-independent parts of $I^{MN}_{zz'}$ are combined with cylindrical accumulation mode basis functions and integrated numerically.

8. The method of claim 1, further comprising the step of determining minimum values and maximum values in each interval for each partial element computation.

9. The method of claim 1, wherein the step of describing a region around each through-silicon via includes the steps of:
  (a) determining a dimension of at least one oxide layer; and
  (b) determining a dimension of at least one depletion region.

10. The method of claim 9, wherein the dimensions of the at least one oxide layer and the at least one depletion region are determined along a z-axis that is normal to a plane of the circuit.

11. A method for modeling electromagnetic effects in a planar circuit that employs a plurality of through-silicon vias in a domain, comprising the steps of:
  (a) describing a region around each through-silicon via in terms of a cylindrical accumulation mode basis function by determining a dimension of at least one oxide layer and by determining a dimension of at least one depletion region;
  (b) incorporating the cylindrical accumulation mode basis function into an equivalent circuit that describes selected electrical characteristics of each through-silicon via;
  (c) selecting a plurality of localized intervals around each through-silicon via;
  (d) approximating a multilayer Green's function for $I^{MN}_{zz'}$ (wherein M and N identify selected layers and wherein zz' designates layer boundaries in a layer through which the through-silicon via passes) in each localized interval without approximating the Green's function over the entire domain as part of a partial element computation, wherein $I^{MN}_{zz'}$ is given by $$P_{k,l} = \int_{S_l}\int_{S_k} v_k v_l I^{MN}_{zz'}(\omega) \, dS_k \, dS_l,$$

where $$I^{MN}_{zz'}(\omega, \rho) = j\frac{\omega}{2\pi}\int_0^\infty \frac{1}{k_\rho}\int_{Z_{N1}}^{Z_{N2}}\int_{Z_{M1}}^{Z_{M2}} (\tilde{G}^{V_e}_{MN} - \tilde{G}^{V_h}_{MN}) dz\, dz'\, J_0(k_\rho \zeta)\, dk_\rho$$

and where $v_k$ and $v_l$ are cylindrical accumulation mode basis functions;
  (e) approximating the coefficients of $A(\omega)$, $B(\omega)$ and $C(\omega)$ of $$I^{MN}_{zz'}(\omega, \rho) = \begin{cases} A(\omega)\ln\rho + B(\omega) & \rho \in I_1 \\ A(\omega)\rho^2 + B(\omega)\rho + C(\omega) & \rho \in I_2 \end{cases},$$

describing $I^{MN}_{zz'}$ over a predetermined range of frequencies ($\omega$);
  (f) computing frequency-independent parts of $I^{MN}_{zz'}$;
  (g) computing frequency-dependent potential coefficients of $I^{MN}_{zz'}$; and
  (h) calculating admittance parameters based on of $I^{MN}_{zz'}$ over a frequency sweep.

12. The method of claim 11, the logarithmic function describing $I^{MN}_{zz'}$ includes a plurality of frequency-independent parts.

13. The method of claim 12, wherein frequency-independent parts of $I^{MN}_{zz'}$ are combined with cylindrical accumulation mode basis functions and integrated analytically.

14. The method of claim 12, wherein frequency-independent parts of $I^{MN}_{zz'}$ are combined with cylindrical accumulation mode basis functions and integrated numerically.

15. The method of claim 11, further comprising the step of determining minimum values and maximum values in each interval for each partial element computation.

16. The method of claim 15, wherein the dimensions of the at least one oxide layer and the at least one depletion region are determined along a z-axis that is normal to a plane of the circuit.

17. A simulator for modeling electromagnetic effects in a planar circuit that employs a plurality of through-silicon vias in a domain, comprising:
  (a) a digital computer; and
  (b) a tangible memory that is readable by the digital computer and that stores a program that causes the digital computer to execute the following steps:
    (i) describing a region around each through-silicon via in terms of a cylindrical accumulation mode basis function by determining a dimension of at least one oxide layer and by determining a dimension of at least one depletion region;
    (ii) incorporating the cylindrical accumulation mode basis function into an equivalent circuit that describes selected electrical characteristics of each through-silicon via;
    (iii) selecting a plurality of localized intervals around each through-silicon via;
    (iv) approximating a multilayer Green's function for $I^{MN}_{zz'}$ (wherein M and N identify selected layers and wherein zz' designates layer boundaries in a layer through which the through-silicon via passes) in each localized interval without approximating the Green's function over the entire domain as part of a partial element computation, wherein $I^{MN}_{zz'}$ is given by $$P_{k,l} = \int_{S_l}\int_{S_k} v_k v_l I^{MN}_{zz'}(\omega) \, dS_k \, dS_l,$$

where $$I^{MN}_{zz'}(\omega, \rho) = j\frac{\omega}{2\pi}\int_0^\infty \frac{1}{k_\rho}\int_{Z_{N1}}^{Z_{N2}}\int_{Z_{M1}}^{Z_{M2}} (\tilde{G}^{V_e}_{MN} - \tilde{G}^{V_h}_{MN}) dz\, dz'\, J_0(k_\rho \zeta)\, dk_\rho$$

and where $v_k$ and $v_l$ are cylindrical accumulation mode basis functions;
    (v) approximating the coefficients of $A(\omega)$, $B(\omega)$ and $C(\omega)$ of $$I^{MN}_{zz'}(\omega, \rho) = \begin{cases} A(\omega)\ln\rho + B(\omega) & \rho \in I_1 \\ A(\omega)\rho^2 + B(\omega)\rho + C(\omega) & \rho \in I_2 \end{cases},$$

describing $I^{MN}_{zz'}$ over a predetermined range of frequencies (ω);

(vi) computing frequency-independent parts of $I^{MN}_{zz'}$;

(vii) computing frequency-dependent potential coefficients of $I^{MN}_{zz'}$; and (viii) calculating admittance parameters based on of $I^{MN}_{zz'}$ over a frequency sweep.

18. The simulator of claim 17, wherein the logarithmic function describing $I^{MN}_{zz'}$ includes a plurality of frequency-independent parts.

19. The simulator of claim 18, wherein frequency-independent parts of $I^{MN}_{zz'}$ are combined with cylindrical accumulation mode basis functions and integrated analytically.

20. The simulator of claim 18, wherein frequency-independent parts of $I^{MN}_{zz'}$ are combined with cylindrical accumulation mode basis functions and integrated numerically.

* * * * *